(12) United States Patent
Sweet et al.

(10) Patent No.: US 8,891,252 B2
(45) Date of Patent: Nov. 18, 2014

(54) OFFLINE POWER SUPPLY AND APPARATUS FOR CHARGING A PLUG-IN VEHICLE

(75) Inventors: Benjamin D. Sweet, West Bloomfield, MI (US); Krzysztof Klesyk, Novi, MI (US)

(73) Assignee: Lear Corporation, Southfield, MI (US)

( * ) Notice: Subject to any disclaimer, the term of this patent is extended or adjusted under 35 U.S.C. 154(b) by 645 days.

(21) Appl. No.: 13/155,905

(22) Filed: Jun. 8, 2011

(65) Prior Publication Data

US 2012/0314462 A1 Dec. 13, 2012

(51) Int. Cl.
*H02M 3/335* (2006.01)
*H02M 1/36* (2007.01)
*H02J 7/02* (2006.01)

(52) U.S. Cl.
CPC ... *H02M 1/36* (2013.01); *H02J 7/02* (2013.01)
USPC .......................................................... 363/16

(58) Field of Classification Search
CPC .................................. H02M 1/10; H02M 1/16
USPC ................................ 363/15, 16, 49
See application file for complete search history.

(56) References Cited

U.S. PATENT DOCUMENTS

| | | | |
|---|---|---|---|
| 3,967,604 A * | 7/1976 | Kondo | 123/335 |
| 5,390,101 A | 2/1995 | Brown | |
| 5,448,465 A * | 9/1995 | Yoshida et al. | 363/15 |
| 5,856,905 A * | 1/1999 | Eckel et al. | 361/187 |
| 6,061,257 A | 5/2000 | Spampinato et al. | |
| 6,198,638 B1 | 3/2001 | Lee | |
| 6,445,268 B1 | 9/2002 | Daum | |
| 6,760,234 B2 * | 7/2004 | Yuzurihara et al. | 363/16 |
| 7,295,449 B2 | 11/2007 | Berghegger | |
| 7,894,212 B2 | 2/2011 | Nishikawa | |
| 2003/0210118 A1 | 11/2003 | Tobita | |
| 2006/0062027 A1 | 3/2006 | Hutchins | |
| 2008/0061746 A1 | 3/2008 | Kobayashi et al. | |

FOREIGN PATENT DOCUMENTS

CN 1836365 A 9/2006

* cited by examiner

*Primary Examiner* — Matthew Nguyen
(74) *Attorney, Agent, or Firm* — Brooks Kushman P.C.

(57) ABSTRACT

An offline power supply includes a power supply circuit including a primary-side circuit for connecting to a first power source, a secondary-side circuit for connecting to a load, and a transformer connecting the primary-side circuit and the secondary-side circuit. A switch operates to selectively connect the primary-side circuit to the first power source. A second power source is charged during operation of the power supply circuit. A controller powered by the second power source has at least one input, and an output to selectively operate the switch based on the at least one input.

12 Claims, 2 Drawing Sheets

OFFLINE POWER SUPPLY AND APPARATUS FOR CHARGING A PLUG-IN VEHICLE

TECHNICAL FIELD

The invention relates to low-power plug-in battery chargers and power supplies that cut parasitic energy waste when the unit is not charging.

BACKGROUND

Existing, standard low-power plug-in chargers are made by many manufacturers and are in widespread use. These chargers have no automatic control to disconnect the transformer primary from AC power. These systems consume energy as long as they are plugged in, whether or not the system is operating.

More generally, existing power supplies result in parasitic non-operating energy waste. An off-line power supply continues to consume energy as long as the system is plugged-in, even when the system for which power is being supplied is not operational, such as when the system is off, battery is fully charged, etc.

Examples of such systems include power supplies for laptop computers, plug-in battery chargers for hand-held electronic devices such as cell phones, portable music players. Any "instant on" device that responds to remote control units, such as television sets, cable boxes, also continues to consume energy even when the unit is turned off. This is necessary to allow the unit to be able to respond to the remote control signal.

Put another way, as long as there is an AC transformer plugged into the AC power source, the unit will consume energy. The only way to stop this parasitic power consumption is to remove the AC power source. Removing the AC power source usually requires unplugging the unit from the AC socket. This may be an inconvenience and many users leave units plugged in all the time, resulting in considerable waste of energy when considered across the distribution of households on a continual basis.

An existing high power (200-400 VDC) charger has a switch (transistor) on the primary side of the transformer for control. Since a control signal is necessary to activate this switch and energize the transformer, the system requires an existing battery charge to be present in order to initialize the charger system operation.

Background information may be found in U.S. Pat. Nos. 7,894,212, 6,445,268, 6,198,638, 5,390,101, 6,061,257, and 7,295,449. Further background information may be found in U.S. Pub. Nos. 2003/0210118, 2008/0061746, 2006/0062027.

SUMMARY

In one embodiment, an offline power supply comprises a power supply circuit including a primary-side circuit for connecting to a first power source, a secondary-side circuit for connecting to a load, and a transformer connecting the primary-side circuit and the secondary-side circuit. A switch operates to selectively connect the primary-side circuit to the first power source. A second power source is charged during operation of the power supply circuit. A controller powered by the second power source has at least one input. The controller generates an output to selectively operate the switch based on the at least one input. A voltage isolation mechanism is preferably located between the output generated by the controller and the switch.

It is appreciated that embodiments of the invention may be implemented in a variety of ways. For example, the second power source may be a capacitor. Various controller inputs are possible. The controller may include a periodic wake up input to cause the periodic selective operation of the switch to charge the capacitor. One way to implement the periodic wake up input, when the second power source is a capacitor, is by making the periodic wake up input a connection to the capacitor to monitor the charge of the capacitor. As well, the controller may include one or more trigger inputs, such as a trigger input for monitoring the load. A trigger input for monitoring the load may be implemented as a connection to the secondary-side circuit to sense a load current.

In another possible feature, an embodiment of the invention may include a manual bypass switch operable to selectively connect the primary-side circuit to the first power source to thereby charge the second power source. An interlock mechanism may be associated with the manual bypass switch to allow for a continuous manual bypass.

It is appreciated that the invention involves many different features. These features may be implemented individually, or in various combinations as appropriate for a particular application of the invention. For example, a periodic wake up input, when included, may or may not be directly connected to the second power source. As well, one or more trigger inputs may be included, and controller operation in response may vary depending on the trigger event.

In another embodiment, an apparatus, cord-set, or wall-station for charging a plug-in vehicle is provided. The apparatus comprises a power supply circuit including a primary-side circuit for connecting to a first power source, a secondary-side circuit for connecting to the vehicle, and a transformer connecting the primary-side circuit and the secondary-side circuit. A switch operates to selectively connect the primary-side circuit to the first power source. A second power source is charged during operation of the power supply circuit. A controller powered by the second power source has at least one input. The controller generates an output to selectively operate the switch based on the at least one input. The at least one input includes a periodic wake up input to cause the periodic selective operation of the switch to charge the second power source. The periodic wake up input is a connection to the second power source to monitor the charge of the second power source. The at least one input includes a trigger input for monitoring the connection to the vehicle.

BRIEF DESCRIPTION OF THE DRAWINGS

FIG. 3 illustrates an implementation of a controller in which a periodic wake up input and multiple trigger inputs are used.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In accordance with an embodiment of the invention, an intelligent offline power supply can detect that there is negligible operating current and as a result can disconnect the primary side of the AC transformer. This has the same effect as un-plugging the power supply from the AC power source. When the AC source is disconnected, the power supply ceases to consume energy. When system operation current draw is detected by the controller, the AC power source is reconnected thereby resuming normal operation of the transformer.

In this embodiment, the controller itself runs from voltage stored in a super or high-efficiency capacitor that is charged when the transformer is operating normally. If the operational voltage of the capacitor falls below a threshold level, the controller re-connects the AC power source long enough to re-charge the capacitor. In an example implementation, re-charging may be completed within several seconds. After the capacitor is recharged, the AC power source is again disconnected by the controller. The capacitor voltage, in some embodiments, is less than 60 V.

At the more detailed level, a bypass switch may be provided to allow for the initial charging of the capacitor, thereby enabling the controller. The switch also allows for the system restoration if the capacitor ever completely discharges. In some implementations, a mechanical interlock may allow the user to permanently bypass the shutoff controller, making the system behave as a normal system without the disconnect feature.

It is appreciated that embodiments of the invention have many applications. For example, embodiments of the invention may be suitable for all low-power products that use a plug-in charger; or offline power supplies and consumer electronics devices that maintain some minimal level of operation in their off state. In particular, embodiments of the invention may be suitable for battery charging products such as the charger cord set for plug-in hybrid vehicles. And in general, embodiments of the invention may be suitable for all commercial chargers in which a transformer may be normally left plugged in.

Figure 1:
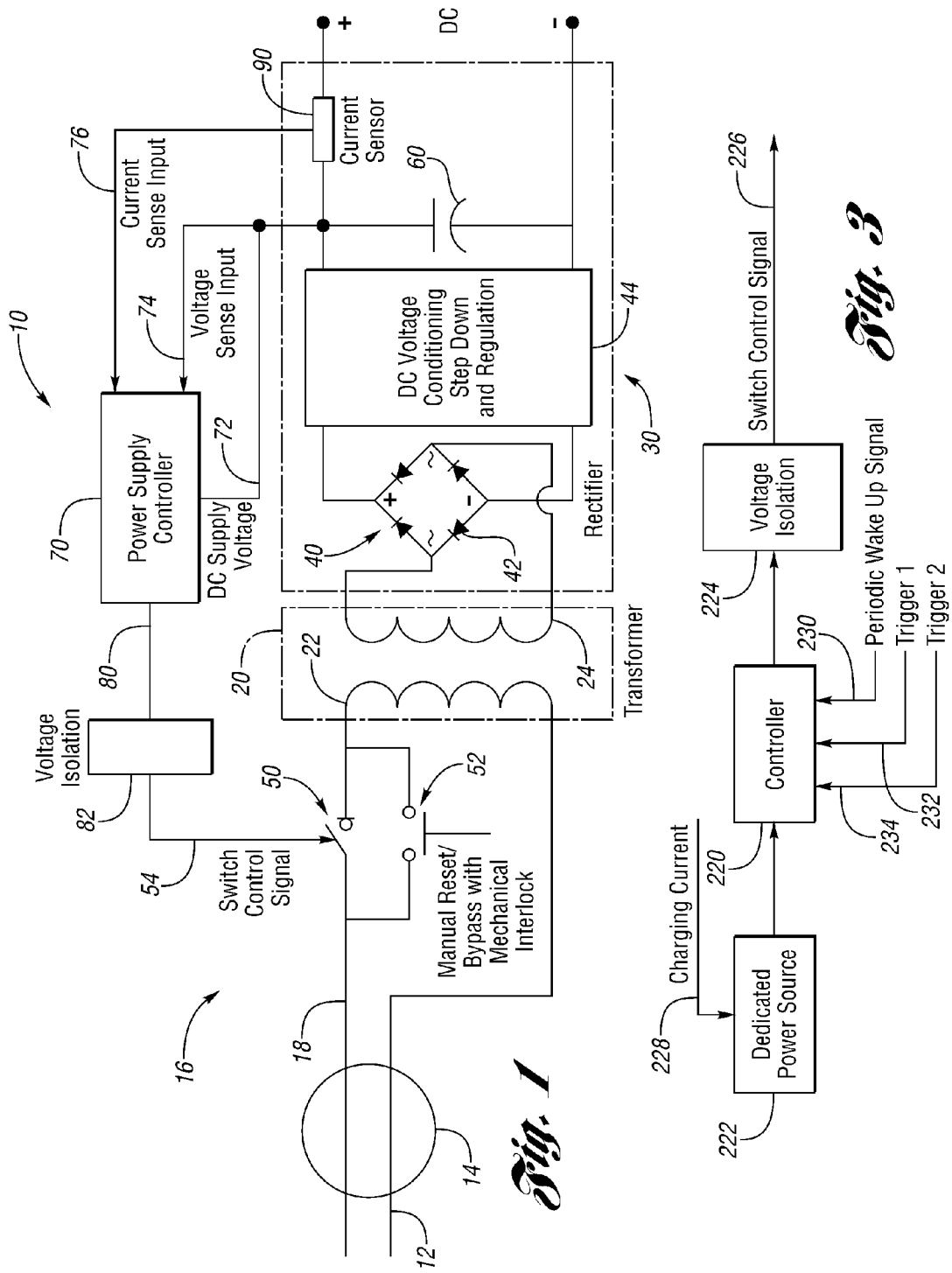
FIG. 1 illustrates a block diagram of an offline power supply in an embodiment of the invention.

FIG. 1 illustrates a block diagram of an offline power supply in an embodiment of the invention. The offline power supply is generally indicated at 10. An AC power source 12 supplies power at AC power source plug 14. The power supply circuit includes a primary-side circuit 16; the primary-side circuit 16 includes connection 18 for connecting to AC power source plug 14.

The power supply circuit further includes a transformer 20. The transformer 20 includes a primary winding 22 and a secondary winding 24. The power supply circuit further includes a secondary-side circuit 30 for connecting to a load. Transformer 20 connects primary-side circuit 16 and secondary-side circuit 30.

The secondary-side circuit 30 is composed of diode bridge rectifier 40, including diodes 42. Further, DC voltage conditioning and step down regulation circuit 44 receives the output of rectifier 40.

It is appreciated that transformer 20, rectifier 40, and step down and regulation circuit 44 may be implemented in any suitable way, as appreciated by one of ordinary skill in the art. Embodiments of the invention are not limited to any particular power supply topology.

With continuing reference to FIG. 1, a switch 50 is operable to selectively connect the primary-side circuit 16 and transformer 20 to the AC power source 12. In addition, a manual reset/bypass switch 52 is provided. The manual bypass switch 52 allows selective connection of the primary-side circuit 16 and transformer 20 to the AC power source 12 by a user; switch 50 is controlled by switch control signal 54. On the other hand, switch 52 may be manually operated.

As well, switch 52 preferably includes a mechanical interlock mechanism to allow for a continuous manual bypass. Switch 50 itself may be implemented in any suitable way, such as a transistor, as appreciated by one of ordinary skill in the art. As well, manual reset/bypass switch and mechanical interlock 52 may be implemented in any suitable way as appreciated by one of ordinary skill in the art.

In accordance with the invention, the offline power supply includes a second power source. The second power source is a dedicated power source, separate from the load. For example, in a low-power battery charger application, the second power source is separate from the battery being charged. In the particular example implementation of FIG. 1, the second power source takes the form of capacitor 60. Capacitor 60 is charged during operation of the power supply circuit.

In more detail, capacitor 60 is a super or high-efficiency capacitor that is charged when the power supply circuit and transformer 20 are operating normally. In some implementations, the capacitor voltage is less than 60 V.

A power supply controller 70 is powered by the second power source, in this case the capacitor 60. The power supply controller 70, in this embodiment, has a DC supply voltage input 72 connected to capacitor 60, a voltage sense input 74 connected to capacitor 60, and a current sense input 76 for load current monitoring. The controller 70 generates an output 80 to selectively operate the switch 50. Output 80 passes through voltage isolation circuit 82, which may be implemented in any appropriate way, to produce the switch control signal 54.

In this embodiment of FIG. 1, voltage sense input 74 functions as a periodic wake up input to cause the periodic selective operation of the switch 50 to charge the capacitor 60. That is, the voltage sense input 74 monitors the charge of capacitor 60.

Current sense input 76 monitors the load. Current sensor 90 senses the load current, and current sense input 76 provides this information to power supply controller 70.

Figure 2:
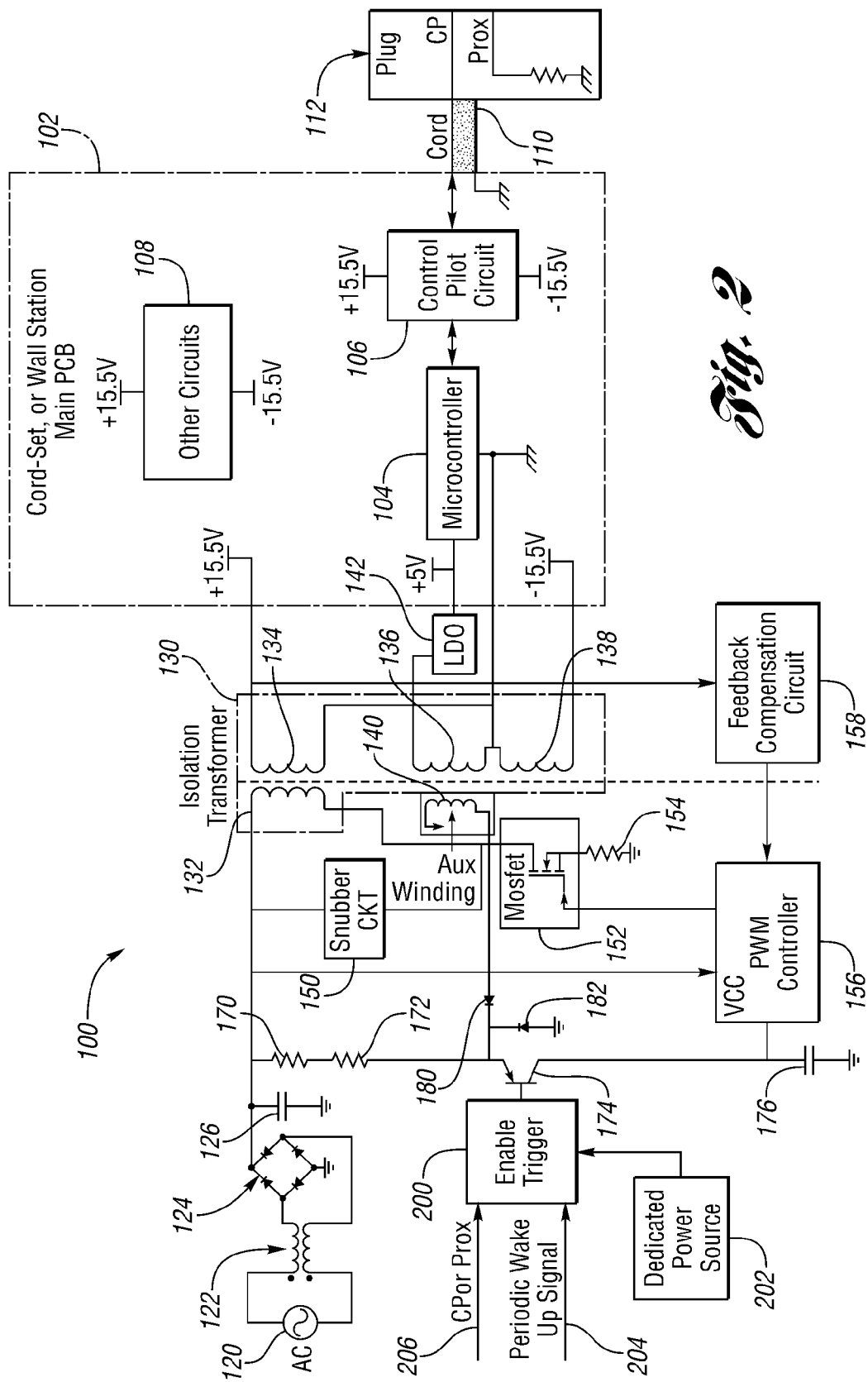
FIG. 2 illustrates an offline power supply in an embodiment of the invention, for use in a plug-in hybrid vehicle application.

FIG. 2 illustrates an offline power supply in an embodiment of the invention, for use in a plug-in hybrid vehicle application. The entire apparatus (cord-set or wall station) is generally indicated at 100. The cord-set or wall station main PCB 102 includes a microcontroller 104, control pilot circuit 106, and other circuits 108. Also depicted are cord 110 and a plug 112, which is configured such that connection to a vehicle causes a control pilot signal or proximity detection. In general, main PCB 102, microcontroller 104, control pilot circuit 106, other circuits 108, and plug 112 operate in a suitable fashion as understood by one of ordinary skill in the art.

An AC power source 120 is connected to input filtering circuitry 122, and to diode bridge 124 and capacitor 126. The rectified DC voltage is connected to isolation transformer 130. Transformer 130 includes primary winding 132, and a series of secondary windings 134, 136, 138; the transformer also includes auxiliary winding 140. Low-dropout regulator 142 provides a regulated voltage for microprocessor 104. The switched power supply provides output voltages from AC power source 120 in a known manner, via operation of snubber circuit 150, switch 152, resistor 154, PWM controller 156, which receives input from feedback compensation circuit 158.

With continuing reference to FIG. 2, VCC is provided to PWM controller 156 via resistors 170, 172, transistor 174, capacitor 176; auxiliary winding 140 connected to transistor 174 via diodes 180, 182. In accordance with the invention, enable trigger/power supply controller 200 is isolated from and operates switch 174; otherwise operation of the overall power supply may occur in a suitable manner as understood by one of ordinary skill in the art.

Enable trigger 200 receives power from a dedicated power source 202. Enable trigger 200 may be triggered based on the control pilot or a proximity signal 206. Enable trigger 200 also receives periodic wake up signal 204. The periodic wake up signal may be utilized to drive the low voltage side of isolation components such as an optocoupler, and charge dedicated power source 202. It is appreciated that the operation of enable trigger 200 based on control pilot/proximity input 206 and periodic wake up signal 204, and cooperation with dedicated power source 202 occurs in accordance with the explanations given above.

FIG. 3 illustrates an implementation of a controller in which a periodic wake up input and multiple trigger inputs are used. The controller 220 is powered by dedicated power source 222, and generates a switch control signal 226. Voltage isolation block 224 isolates the low voltage controller 220 from the switch-controlled high voltage components. The dedicated power source 222 is charged during operation of a power source controlled by switch control signal 226.

The controller 220 has multiple inputs including a periodic wake up signal input 230, first trigger input 232 and second trigger input 234. The controller 220 processes the multiple inputs to produce the switch control signal 226.

A trigger could be implemented in a variety of ways. For example, remote control signal, optical, solar, etc., are possibilities. For example, a photo diode could be used to turn on the supply when a light is on, or in another example, to shut off the supply when a light is on when used in combination with a depletion mode MOSFET. In one possibility, an integrated circuit (IC) may have an integrated solar cell and be used to control the power supply.

While embodiments of the invention have been described, it is appreciated that various alternative embodiments are possible.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An offline power supply comprising:
   a power supply circuit including a primary-side circuit for connecting to a first power source, a secondary-side circuit for connecting to a load, and a transformer connecting the primary-side circuit and the secondary-side circuit;
   a switch operable to selectively connect the primary-side circuit to the first power source;
   a second power source that is charged during operation of the power supply circuit; and
   a controller powered by the second power source and having at least one input, the controller generating an output to selectively operate the switch based on the at least one input.

2. The offline power supply of claim 1 wherein the second power source is a capacitor.

3. The offline power supply of claim 2 wherein the at least one input includes a periodic wake up input to cause the periodic selective operation of the switch to charge the capacitor.

4. The offline power supply of claim 3 wherein the periodic wake up input is a connection to the capacitor to monitor the charge of the capacitor.

5. The offline power supply of claim 3 wherein the at least one input includes a trigger input for monitoring the load.

6. The offline power supply of claim 5 wherein the trigger input is a connection to the secondary-side circuit to sense a load current.

7. The offline power supply of claim 1 further comprising:
   a manual bypass switch operable to selectively connect the primary-side circuit to the first power source to thereby charge the second power source.

8. The offline power supply of claim 7 further comprising:
   an interlock mechanism associated with the manual bypass switch to allow for a continuous manual bypass.

9. The offline power supply of claim 1 wherein the at least one input includes a periodic wake up input to cause the periodic selective operation of the switch to charge the second power source.

10. The offline power supply of claim 9 wherein the periodic wake up input is a connection to the second power source to monitor the charge of the second power source.

11. The offline power supply of claim 9 wherein the at least one input includes a trigger input for monitoring the load.

12. The offline power supply of claim 1 further comprising:
    a voltage isolation mechanism between the output generated by the controller and the switch.

* * * * *